(12) United States Patent
Li et al.

(10) Patent No.: US 10,250,610 B2
(45) Date of Patent: Apr. 2, 2019

(54) METHOD AND SYSTEM FOR COMMUNICATION CONTROL

(71) Applicant: International Business Machines Corporation, Armonk, NY (US)

(72) Inventors: Guang Qi Li, Beijing (CN); Jia Wang, Beijing (CN); Ying Ying Xu, Beijing (CN); Qiu Lu Yuan, Beijing (CN); Jia Tian Zhong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 14/848,891

(22) Filed: Sep. 9, 2015

(65) Prior Publication Data

US 2016/0094532 A1 Mar. 31, 2016

(30) Foreign Application Priority Data

Sep. 30, 2014 (CN) .......................... 2014 1 0522976

(51) Int. Cl.
*H04L 29/06* (2006.01)
*G06F 17/30* (2006.01)

(52) U.S. Cl.
CPC ...... *H04L 63/102* (2013.01); *G06F 17/30914* (2013.01); *H04L 63/104* (2013.01); *H04L 63/105* (2013.01)

(58) Field of Classification Search
CPC ............................ H04L 63/102; H04L 63/104
See application file for complete search history.

(56) References Cited

U.S. PATENT DOCUMENTS 5,995,603 A * 11/1999 Anderson ............. H04M 1/663
379/142.04
6,754,317 B1 6/2004 Berthoud et al.
(Continued)

FOREIGN PATENT DOCUMENTS

CN 1588969 A 3/2005
CN 101227528 A 7/2008
(Continued)

OTHER PUBLICATIONS

Chung, Ki-Sook; Keum, Changsup; "Access Control Management of the Cloud Service Platform", International Conference on Information and Communication Technology Convergence (ICTC), IEEE, Oct. 22-24, 2014, pp. 621-625.*

(Continued)

*Primary Examiner* — Victor Lesniewski
(74) *Attorney, Agent, or Firm* — Nolan M. Lawrence

(57) ABSTRACT

A request for communicating with a first user is received by a second user. The request includes a first identification specific to the first user. The first identification is different from an account used by the first user in the communication. Based on a communication mapping associated with the first user, it is determined whether the second user is allowed to communicate with the first user using the first identification. The communication mapping indicates authorized users allowed to communicate with the first user and respective identifications allowed to be used by the authorized users. The account used by the first user in the communication is obtained to initiate the communication with the first user. The account used is obtained in response to determining that the second user is allowed to communicate with the first user using the first identification.

14 Claims, 5 Drawing Sheets

(56) References Cited

U.S. PATENT DOCUMENTS

| | | | | |
|---|---|---|---|---|
| 6,985,924 | B2* | 1/2006 | Schwartz | H04L 29/06 379/93.24 |
| 8,078,677 | B2* | 12/2011 | Mendiola | H04L 63/104 707/781 |
| 8,150,987 | B2* | 4/2012 | Murphy | H04L 63/123 709/228 |
| 8,189,570 | B2 | 5/2012 | Bessis | |
| 8,358,760 | B2 | 1/2013 | Croak et al. | |
| 8,639,225 | B2 | 1/2014 | Nzumafo | |
| 2003/0039241 | A1 | 2/2003 | Park et al. | |
| 2003/0073434 | A1* | 4/2003 | Shostak | H04M 1/725 455/426.1 |
| 2005/0071271 | A1* | 3/2005 | Hettish | H04L 63/102 705/50 |
| 2006/0004921 | A1* | 1/2006 | Suess | G06Q 10/109 709/227 |
| 2007/0073888 | A1* | 3/2007 | Madhok | H04L 29/12009 709/227 |
| 2009/0089308 | A1* | 4/2009 | Beadle | G06F 17/30575 |
| 2009/0117883 | A1* | 5/2009 | Coffing | H04W 4/21 455/414.1 |
| 2009/0147937 | A1* | 6/2009 | Sullhan | H04M 3/42068 379/201.02 |
| 2010/0005518 | A1* | 1/2010 | Tirpak | H04L 67/306 726/6 |
| 2011/0033033 | A1* | 2/2011 | Koul | H04M 3/565 379/202.01 |
| 2011/0201320 | A1* | 8/2011 | Wosk | H04M 1/274516 455/415 |
| 2012/0039452 | A1* | 2/2012 | Horn | H04L 63/083 379/188 |
| 2012/0157064 | A1* | 6/2012 | Daubrawa | H04M 3/436 455/414.1 |
| 2012/0226527 | A1* | 9/2012 | Carwile, Jr. | G06Q 10/107 705/7.38 |
| 2013/0014266 | A1* | 1/2013 | Yeung | H04L 63/104 726/26 |
| 2013/0185368 | A1* | 7/2013 | Nordstrom | H04W 4/21 709/206 |
| 2014/0082088 | A1* | 3/2014 | Ye | H04L 63/102 709/204 |
| 2014/0164517 | A1* | 6/2014 | Valdetaro | H04L 63/0281 709/204 |
| 2014/0185786 | A1* | 7/2014 | Korn | H04M 3/4365 379/210.02 |
| 2014/0195626 | A1* | 7/2014 | Ruff | H04L 63/104 709/206 |
| 2014/0357245 | A1* | 12/2014 | Ibasco | H04M 3/42042 455/415 |

FOREIGN PATENT DOCUMENTS

| | | |
|---|---|---|
| CN | 101379863 A | 3/2009 |
| CN | 101702795 A | 5/2010 |
| CN | 103281680 A | 9/2013 |
| WO | 2012154593 A1 | 11/2012 |

OTHER PUBLICATIONS

Li et al., "Method and System for Communication Control," U.S. Appl. No. 14/927,111, filed Oct. 29, 2015.

List of IBM Patents or Patent Applications Treated as Related, signed Oct. 28, 2015, 2 pages.

Li et al., "Method and System for Communication Control," CN Application No. 201410522976.5, Filed Sep. 30, 2014, 38 pages.

Nicole, K., "Jangl Lets You Call Anyone with an Email Address," Mashable.com, May 23, 2007, printed: Jul. 17, 2015, 2 pages, http://mashable.com/2007/05/23/jangl-call-anyone/.

* cited by examiner

METHOD AND SYSTEM FOR COMMUNICATION CONTROL

FIELD

Embodiments of the present invention relate to the communication field, and more specifically, to a method and apparatus for communication control.

BACKGROUND

A telephone call is one of most common communication means in daily life and work. However, in the traditional telephone call, it is inconvenient to manage communication information. A party initiating a call (called "caller") has to know the telephone number of a called party (called "callee") before making a telephone call. A user may record telephone numbers of contacts into a communication list of an electronic and/or traditional medium. However, when the telephone number of a contact is updated, the user has to correspondingly update the communication list; otherwise, it will cause call failure.

Another problem associated with a traditional telephone call lies in the annoyance of an undesired telephone call. In some cases, a user would let out his/her telephone number to other purpose for a special purpose. However, when the special purpose has been fulfilled, the person getting the user's telephone number likely continues launching a telephone call to the user, which might be unwanted to the user. Even worse, the user's telephone number might be leaked to an irrelevant third party or even a malicious party. As a result, the user would receive many unwanted telephone calls (e.g., sales promotion, advertising, etc.) or malicious harassing calls.

In addition to the telephone call, many other types of communications also have a similar problem. For example, a user likely receives mass spam SMS (short messaging services) due to leakage of telephone number. For another example, a user likely receives unwanted information due to leakage of instant messaging account.

SUMMARY

In general, embodiments of the present invention provide a technical solution for communication control.

In one aspect, embodiments of the present invention provide a method for communication control. The method comprises: receiving, from a second user, a request for communicating with a first user, the request including a first identification specific to the first user, the first identification being different from an account used by the first user in the communication; determining, based on a communication mapping associated with the first user, whether the second user is allowed to communicate with the first user using the first identification, the communication mapping indicating authorized users allowed to communicate with the first user and respective identifications allowed to be used by the authorized users; and obtaining, in response to determining that the second user is allowed to communicate with the first user using the first identification, the account used by the first user in the communication to initiate the communication with the first user.

In another aspect, embodiments of the present invention provide an apparatus for communication control. The apparatus comprises: a request receiving unit configured to receive, from a second user, a request for communicating with a first user, the request including a first identification specific to the first user, the first identification being different from an account used by the first user in the communication; a determining unit configured to determine, based on a communication mapping associated with the first user, whether the second user is allowed to communicate with the first user using the first identification, the communication mapping indicating authorized users allowed to communicate with the first user and respective identifications allowed to be used by the authorized users; and a first account obtaining unit configured to obtain, in response to determining that the second user is allowed to communicate with the first user using the first identification, the account used by the first user in the communication to initiate the communication with the first user.

It will be understood through the following description that according to the embodiments of the present invention, for any given type of communication, the initiator of the communication may launch a communication with a target user using any other identification specific to a target user than the communication account. In this way, leakage of the communication account such as a telephone number may be prevented while allowing normal communication. Therefore, the user privacy and communication security can be well protected. Other features and advantages of the present invention may become easily comprehensible through the description below.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein.

In respective figures, same or like reference numerals are used to represent the same or like components.

DETAILED DESCRIPTION

Some preferable embodiments will be described in more detail with reference to the accompanying drawings, where the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
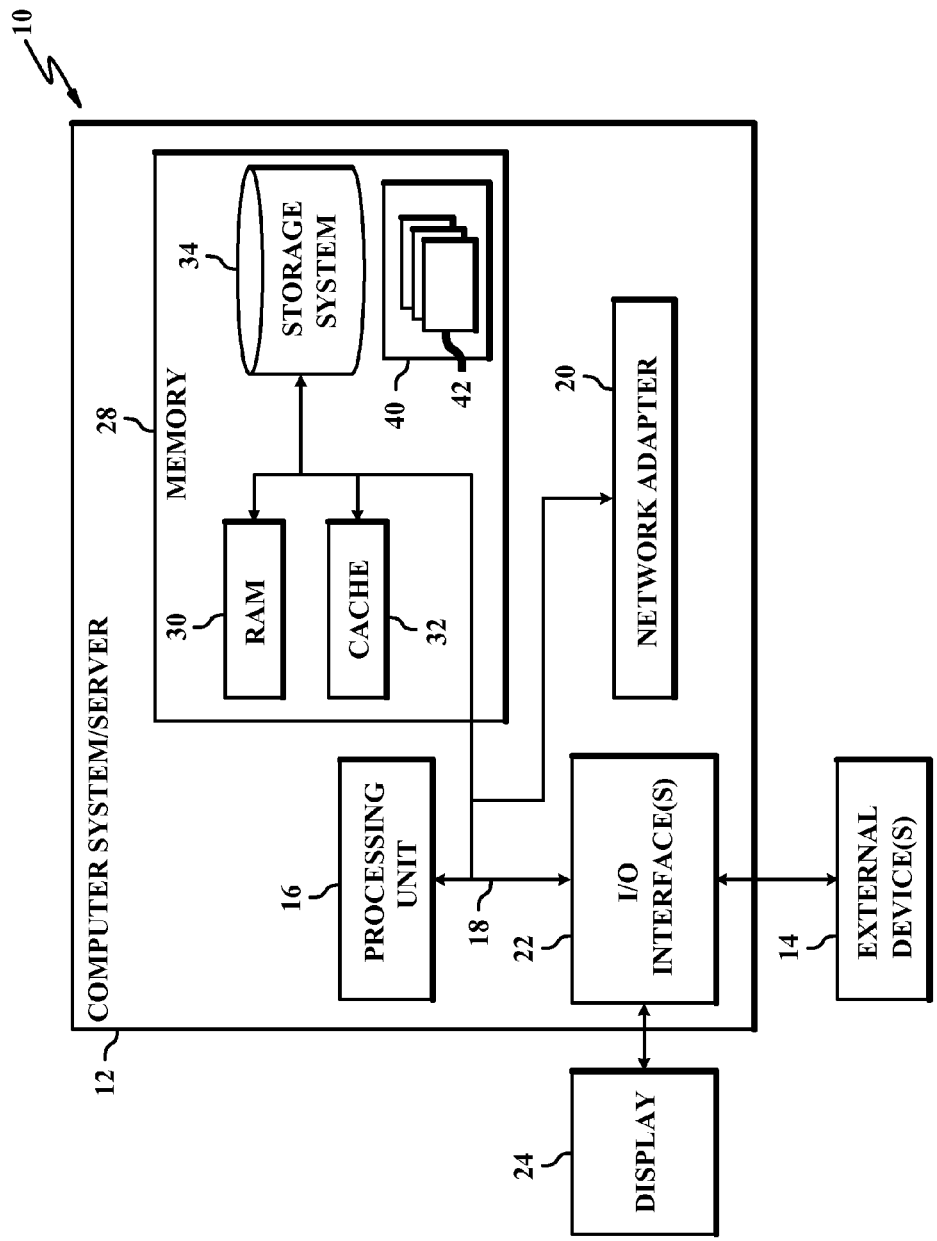
FIG. 1 shows an exemplary computer system/server which is applicable to implement embodiments of the present invention.

Referring now to FIG. 1, where an exemplary computer system/server 12 which is applicable to implement embodiments of the present invention is shown. Computer system/ server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Hereinafter, the mechanism and principle of embodiments of the present invention will be described in detail. Unless otherwise stated, the term "based on" used hereinafter and in the claims expresses "at least partially based on." The term "comprise" or "include" or a similar expression indicates an open inclusion, i.e., "including, but not limited to. . . . " The term "plural" or a similar expression indicates "two or more." The term "one embodiment" indicates "at least one embodiment." The term "another embodiment" indicates "at least one another embodiment." Definitions of other terms will be provided in the description below.

In addition, terms such as "first," "second," and "third" used herein are only for the convenience of reference, not intended to impose any limitation to the described objects in terms of sequence or time. Moreover, unless otherwise indicated, these termism do not necessarily have to refer to different objects. For example, "a first user" and "a second user" may be different users or identical users.

Figure 2:
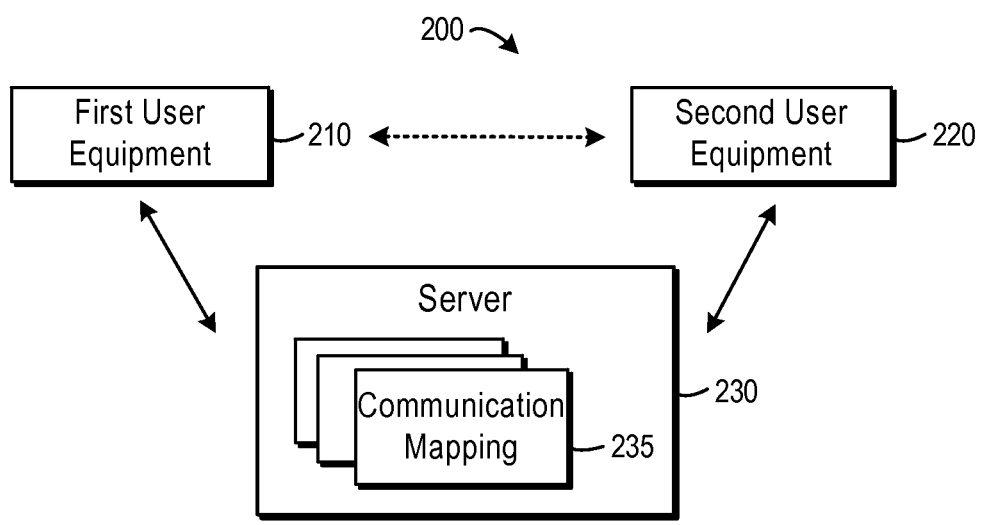
FIG. 2 shows a schematic block diagram of a communication system in which the embodiments of the present invention may be implemented.

First, refer to FIG. 2, in which a schematic block diagram of a communication system 200 in which the embodiments of the present invention may be implemented. In one embodiment, the communication system 200 may be an instant messaging system or any currently known or future developed system enabling communication between users.

Only out of the purpose of illustration, some embodiments of the present invention is likely described with reference to a telephone call below. However, this is only exemplary, not intended to limit the scope of the present invention in any manner. In other embodiments, the embodiments of the present invention may be used to control any appropriate type of communication such as SMS, MMS (multimedia messaging service), instant messaging, Voice over IP (VoIP), network communication, etc.

In the example shown in FIG. 2, the communication system 200 at least comprises a first user equipment 210 and a second user equipment 220, as well as a communication server (hereinafter referred to as "server") 230. The server 230 may be operated and maintained by a communication service provider, for supporting communication between different user equipments. For example, the server 230 may be implemented using the computer/server 12 described above with reference to FIG. 1.

The user equipments 210 and 220 are both equipments used by terminal users. The user equipment 210 and/or 220 may be a communication-enabled mobile device, e.g., a mobile phone. However, it should be noted that various currently known or future developed user equipments include, but not limited to: a portable digital assistant (PDA), a pager, a mobile computer, a mobile TV, a game device, a laptop, a camera, a video camera, a GPS device, and other type of voice and text communication system. A fixed type user equipment, e.g., a fixed telephone, may likewise use the embodiments of the present invention.

In the description below, the user of the first user equipment 210 is called "a first user" acting as a target user for a communication, while the user of the second user equipment 220 is called "a second user" acting as an originating user of the communication. Of course, it is only for the purpose of illustration. It would be appreciated that the first user equipment 210 may likewise act as a communication originator, such that the second user equipment 220 acts as the communication target. Further, for the convenience of discussion, in the context of the present disclosure, terms "user" and "user equipments" may be used in exchange.

According to the embodiments of the present invention, the first user as the communication target mat register with the server 230, and create an associated communication manner on the server after a successful registration. Moreover, for each authorized user, the communication mapping 235 may indicate which information is allowed to launch a communication with the first user. With the telephone call as an example, the communication mapping may designate a caller that can call the first user, and may also designate what information may be used by the caller to launch a telephone call to the first user.

More specifically, it is known that for each communication type, the user may have an account used for this kind of communication. For example, the account of telephone call and SMS may be a telephone number, the account for instant communication is a corresponding communication account, the VoIP account number for a user may be a network nickname, etc. According to the embodiments of the present invention, for each authorized user allowed to communicate with the first user, the communication mapping will record one or more identifications of the first user used for originating the communication. Each of these identifications is specific to the first user, i.e., uniquely associated with the first user. In particular, these identifications recorded by the communication mapping are not the account of the first user for a corresponding type of communication.

With the telephone call as an example, the communication account of the first user for this type of communication is a telephone number. However, an identification specific to the first user recorded in the communication mapping may comprise an email address, an instant communication account, internal code of an organization or structure (e.g., employee number within an enterprise), a network nickname, etc. Note that these are only exemplary, not intended to limit the embodiments of the present invention in any manner. The first user mat use any identification specific to him/her. Moreover, the identification specific to the first user is not limited to a character string. For example, in one embodiment, an image, graph or multimedia information specific to the first user may be used. As an example, a QR code specific to the first user may be used as the identification. As an example, a QR code specific to the first user may act as the identification of the first user.

As an example, in one embodiment, the communication mapping may be implemented in the form of a table, e.g., called "communication mapping table." The communication mapping table may be maintained by the communication service provider, e.g., maintained at the server 230. Table 1 below shows an example of a communication mapping table associated with the first user for a telephone call.

TABLE 1

| Originating user ID | Target user ID | Target user communication account |
|---|---|---|
| 232303 | xxx@aaa.bbb | 1380xxxxxxx |
| 232404 | Q123456 | 1380xxxxxxx |
| 232404 | 9999382742 | 861058xxxxxx |
| ... | ... | ... |

In the example shown in Table 1, the first column in the communication mapping table is an identity (ID) of an authorized user that may call the first user. According to the embodiments of the present invention, the ID of each user may be a globally unique identification generated by the server 230, e.g., including letters, numbers, special symbols, or any combination thereof. It should be noted that the ID is optional, and may be omitted from the communication mapping in some cases. For example, in some cases, an identification (e.g., an email-address) specific to each user is globally unique in the entire communication system 200. In this case, the identification may be directly used to distinguish users, without a need to store a specific ID.

Based on the communication association shown in Table 1, the first entry (the first line) associates the authorized user with an ID "232303" with an email address xxx@ aaa.bbb specific to the first user. In other words, in this example, the identification specific to the first user is the email address of the first user. It may be seen that the identification is not a telephone number of the first user. In this way, the authorized user with the ID "232303" may use the email address to call the telephone number 1380******* of the first user. For example, during the operation, the user with the ID "232303" may enter, in his/her user equipment, the email address of the first user, and sends it to the server 230 to initiate a telephone call to the user equipment 210 of the first user.

Similarly, the second entry in Table 1 associates the user with an ID "232404" with another identification "Q123456" of the first user, the identification, e.g., being an account of an instant messaging application of the first user. Therefore, the user with the ID "232404" may initiate a telephone call to the first user using the account of the instant messaging application. According to the third entry, the user with the ID "232404" may also be allowed to use a further identification "9999382742" of the first user (e.g., an employee number of the first user within an enterprise) of the first user to call the fixed phone "861058******" of the first user. In other words, the same authorized user ma use different identifications of the first user to initiate a communication with different communication accounts of the first user. Of course, it is likewise feasible to initiate a communication with the same communication account of the first user using different identifications of the first user.

It would be appreciated that Table 1 only shows a simple form of a communication mapping table. In other embodiments, the communication mapping table may include any appropriate additional field. Embodiments in this aspect will be described below. In some other embodiments, the communication mapping table may be further simplified. For example, in one embodiment, the server 230 may independently store the communication accounts of the first user, without storing it in the communication mapping 235.

Additionally, in implementation, the communication mapping is not necessarily implemented into a table. On the contrary, in an alternative embodiment, the communication mapping may be implemented using any appropriate data structure other than the table, e.g., tree, graph, textual file, extensible markup language (XML) file, and etc.

According to the embodiments of the present invention, the server 230 may present a user interface accessible to the first user equipment 210 to allow the first user to create and maintain a communication mapping. For example, the first user may manually create mapping entries in a communication mapping table. Alternatively or additionally, in one embodiment, authorization and communication mapping update may also be performed dynamically in communication. For another example, in one embodiment, the user may create communication mapping entries through signaling. The embodiments in this aspect will be detailed below.

Figure 3:
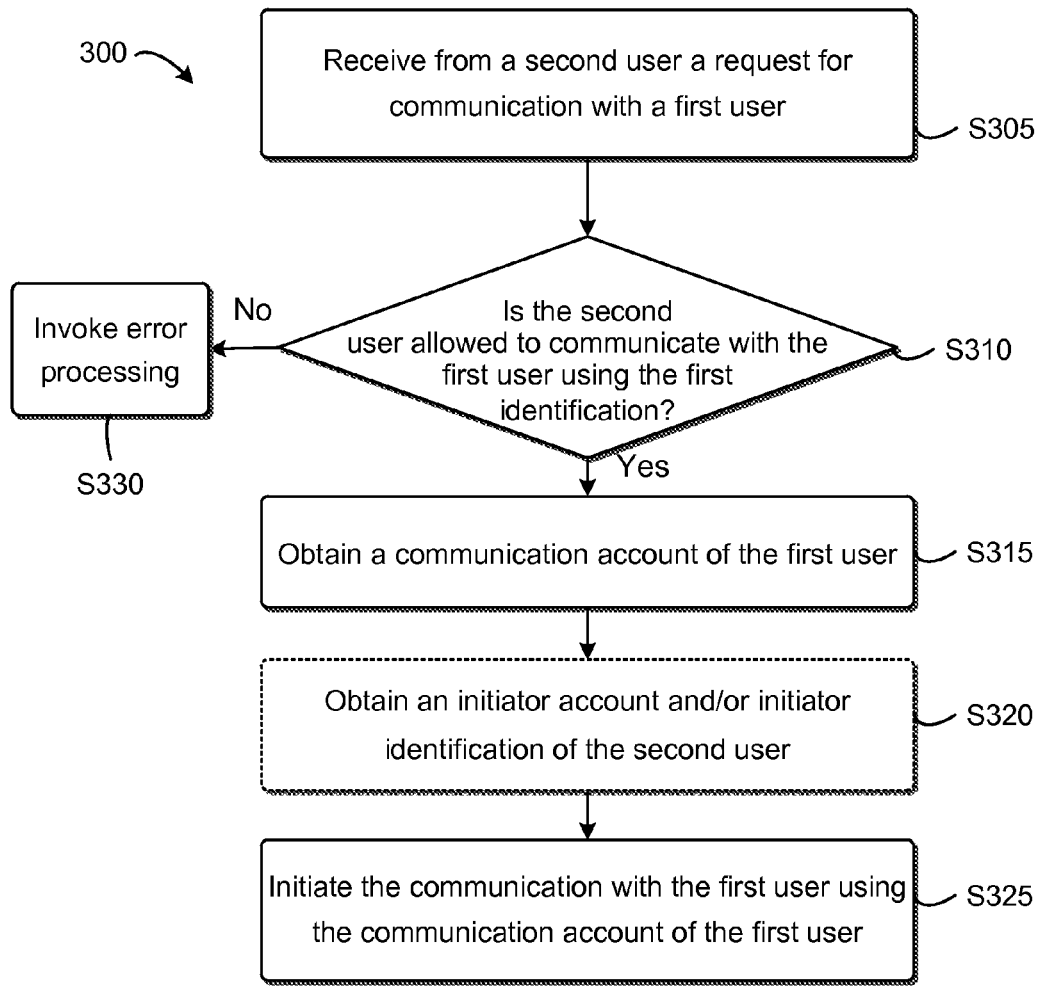
FIG. 3 shows a schematic flow diagram of a method for communication control according to the embodiments of the present invention.

FIG. 3 shows a schematic flow diagram of a method 300 for communication control according to the embodiments of the present invention. According to the embodiments of the present invention, the method 300 may be performed by a communication server provider. For example, in one embodiment, the method 300 may be executed at a server 230 side as shown in FIG. 2.

As shown in the figure, the method starts from step S305, in which a request for communication with a first user is received from a second user. According to the embodiments of the present invention, the communication request received from the second user at least includes at least one identification specific to a first user. At the ease of discussion, the identification specific to the first user as included in the communication request is called "a first identification." In particular, the first identification is different from a communication account of the first user in a desired communication initiated by the second user. For example, in an example of a telephone call, the first identification may be any other identification than the telephone number of the first user, e.g., an email address, an instant messaging account, a network account, an internal code within an organization, or any other appropriate identification.

Moreover, in one embodiment, the first identification may also be an account for a target communication type. However, the first identification is not the account used by the first user in the to-be-initiated communication. Still with the telephone call as an example, the first identification may be a first telephone number of the first user, not the telephone number of the first user which is desirably called by the second user.

In one embodiment, the communication request may also include information that can indicate an identity of the second user. For example, in one embodiment, the communication request may include an identity ID of the second user in the system, e.g., that kind of identity as shown in column 1 in the above table 1. Alternatively or additionally, in other embodiments, if the second user is also a registered user of the communication system, the communication request may include an identification specific to the second user as already recorded in the system, e.g., the email address, employee number and the like of the second user. As a further example, in one embodiment, the communication request may also include a communication account of a communication desired to be initiated by the second user. For example, in the telephone call, the communication request may include the telephone number of the second user, which may likewise indicate the identity of the second user. Any other information capable of indicating the second user identity may be included in the communication request.

It should be noted that according to the embodiments of the present invention, it is not compulsorily required that the communication request include the identity information of the second user. In some cases, the server of the communication system may automatically determine the identity of the second user based on the communication request sent by the second user. For example, in a telephone communication, the server may automatically detect the telephone number of the caller. For another example, in a network communication, the identity of the second user may be determined based on a medium access control (MAC) address or network address of the user equipment used by the second user. In this case, the communication request may only include a first identification specific to the first user.

The method 300 proceeds to step S310, where it is determined whether the second user is allowed to communicate with the first user using the first identification based on a communication mapping associated with the first user. As mentioned above, the communication mapping indicates authorized users allowed to communicate with the first user and which identification(s) of the first user is allowed to use by each authorized user to initiate a communication with the first user. Example of the communication mapping may refer to the above described Table 1, for example.

As an example, the communication mapping is implemented in the embodiment of the communication mapping table, whether there is an association between the second user and the first identification may be searched in the communication mapping table associated with the first user. If such a mapping entry is found, it may be determined that the second user is allowed to use the first identification to call the first user. Otherwise, it may be determined that the second user currently is not allowed to call the first user using the first identification in the communication request.

Only for the purpose of illustration, in conjunction with Table 1 as described above, a specific example in a telephone call will be discussed. Suppose the first identification included in the communication request received in step S305 is the email address xxx@ aaa.bbb of the first user. In addition, suppose it is determined that the identity ID of the second user is "232303" based on the identity information included in the communication request and/or automatic detection by the server. It is seen from the communication mapping table, there is a mapping entry (the first entry in Table 1) associating the identity ID "232303" of the second user with the first identification XXX@ aaa.bbb of the first user. In this case, it may be determined that the second user is allowed to initiate a telephone call to the first user using the first identification.

On the other hand, if the identity ID of the second user is determined as "232304" and the first identification is xxx@ aaa.bbb, then there is association between the second user and the first identification in the communication mapping. Correspondingly, it may be determined that the second user is not allowed to initiate a telephone call to the first user using the first identification.

According to the embodiments of the present invention, besides the communication mapping specific to an individual user, the communication mapping may also include a group communication mapping for a user group. For example, within an organization, users may be allowed to perform mutual communication using codes inside the organization. In this case, a user group for the organization and a group communication mapping for the user group may be created. If a user joins in the user group, his/her information will be added into the group communication mapping. The group communication mapping may indicate identifications for initiating communications between members of the user group.

As an example, in one embodiment, a user group may be created for employees of one enterprise. Correspondingly, the group communication mapping for the user group may indicate an employee number of each member. Therefore, the members in the user group may initiate a communication (e.g., a telephone call) using the employee number of other member. In one embodiment, such group communication mapping may be implemented as table 2 below.

TABLE 2

| Group ID | Identification (employee number) | Communication account | Note |
|---|---|---|---|
| Grp-1 | 02048028409 | 1380xxxxxxx | Zhang San |
| | 02048028410 | 1380xxxxxxx | Li Si |
| | 02048028420 | 861058xxxxxx | Wang Wu |
| | ... | ... | |

In this example, the group communication mapping records the employee number and telephone number of each member. Alternatively, as mentioned above, the telephone number may also be separately stored by the server without being stored in the mapping table. In addition, the "note" field in the group communication mapping records the names of the employees. Of course, it is not a must. Further, any additional and/or optional relevant information may be recorded in the "note" field. In particular, because the employee number can uniquely identify an employee inside the enterprise, in the group communication mapping shown in Table 2, the unique identity ID of the user in the communication system is not included.

In such an embodiment, in response to the communication request received in step S305, it may be determined whether there is a user group whose first user and second user are both members thereof in the system. If such a user group exists, an entry including the first identification may be looked up in the group communication mapping of the user group. If an entry including the first identification is found, it may be believed that the second user is allowed to use the first identification to communicate with the first user.

Suppose the first identification included in the communication request received in step S305 is the employee number "02048028409" of the first user, and the employee number "02048028420" of the second user may be determined based on the identity information of the second user. The user group associated with Table 2 includes both of the first user and the second user as its members. Moreover, because the employee number of the first user is included in the group call mapping, it may be determined now that the second user is an authorized user, such that he/she may initiate a call to the first user using the employee number of the first user.

Continue reference to FIG. 3, in step S310, if it is determined that the second user is allowed to communicate with the first user using the first identification (branch "yes"), the method 300 proceeds to step S315, where a communication account of the first user used in the communication will be obtained, called "first communication account." For example, in an example of a telephone call, the first communication account is a telephone number of the first user.

In one embodiment, the first communication account may be recorded in a communication mapping associated with the first user. For example, in table 1 and table 2 described above, they both record the telephone number of the first user. In such an embodiment, a communication account of the first user associated with the first identification received in step S305 may be determined based on the communication mapping, as the first communication account. This is beneficial, because in the communication desired to initiate by the second user, the first user likely has more than one communication account. For example, in a telephone call, the user may own a plurality of telephone numbers. By selecting the communication account associated with the first identification, the first user may have a more comprehensive and complete control to the communication security.

Still refer to the above table 1 as described above as an example. In this embodiment, the second user with an identity ID "232303" can only call the mobile phone number 1380xxxxxxx of the first user through an email address, but cannot call other telephone number of the first user, e.g., a home telephone.

However, it should be understood that it is not a must to select the first communication account associated with the first identification based on the communication mapping. As mentioned above, in one embodiment, the communication service provider may separately store the communication account of the user. In such an embodiment, in step S315, the server may select one from among these communication accounts as the first communication account. For example, if the first user and the second user communicated previously, then the server may select the communication account used by the first user in the previous communication as the first communication account. For another example, random selection of the communication account is also feasible.

In one embodiment, when initiating a communication to the first user, a communication account to be used by the second user in the to-be-initiated communication may be optionally presented to the first user, called "initiator account." For example, in a telephone communication, while calling the first user, the telephone number of the second user may be presented to the first user. In this way, the first user may have a more comprehensive and intuitive understanding of the identity of the second user and the incoming communication.

To this end, the method 300 may proceed to an optional step S320, where an initiator account of the second user is obtained. In one embodiment, as mentioned above, the initiator account may be included in the communication request received in step S305. At this point, the initiator account may be directly determined Alternatively, in one embodiment, the initiator account may be stored in the communication mapping. For example, still with the telephone call as an example, in such an embodiment, table 1 shown above may be modified into table 3 below:

TABLE 3

| Initiating user identity ID | Target user identity | Target user communication account | Initiating communication account |
|---|---|---|---|
| 232303 | xxx@aaa.bbb | 1380xxxxxxx | 1390xxxxxxx |
| 232404 | Q123456 | 1380xxxxxxx | 1370xxxxxxx |
| 232404 | 9999382742 | 861058xxxxxx | 1370xxxxxxx |
| ... | ... | ... | ... |

In this embodiment, a value of the "initiating user communication account" field may be read from the mapping entry matching the second user in the communication mapping, as an initiator account of the second user.

For another example, in one embodiment, the communication account of the second user may be separately stored by the communication service provider. At this point, a corresponding communication account may be retrieved as the initiator account of the second user based on the identity of the second user. Any other manner is feasible, and the scope of the present invention is not limited in this aspect.

Additionally or alternatively, in step S320, an identification specific to the second user may also be obtained, called "initiator identification." The initiator identification may be used by the first user to initiate a communication with the second user (called "second communication"). In particular, the initiator identification is not the account of the second user for the second communication.

For example, in one embodiment, the initiator identification and the first identification specific to the first user may be identifications of the same kind, e.g., employee numbers. I other words, in this embodiment, the second user initiates a communication request to the first user using the employee number of the first user. If the communication can be successfully initiated, the employee number of the second user may be presented to the first user. In this way, the first user may subsequently use the employee number of the second user to initiate the second communication with the second user.

Alternatively, the initiator identification may also be an identification of a kind different from the first identification. For example, the first identification may be an email, while the initiator identification may be an instant messaging account. In this embodiment, the second user may initiate the communication with the first user using the email address, while the first user subsequently may initiate the second communication of the second user using the instant messaging account. In this case during the communication with the first user as initiated by the second user, the instant messaging account of the second user may be presented to the first user.

According to the embodiments of the present invention, the initiator identification specific to the second user may be stored by the server 230, e.g., stored in the communication mapping 235 associated with the second user. Alternatively, the initiator identification may also be stored locally at the first user equipment 210. For example, in the contact list stored in the first user equipment, the initiator identification may act as the name of the second user. Any other storage manner is feasible.

It would be appreciated that step S320 is optional and is thus shown in dotted lines in FIG. 3. For example, in one embodiment, the first communication account may be used to initiate a communication with the first user without presenting the communication account of the second user. In this case, it is not needed to obtain the initiator account and/or initiator identification of the second user.

Afterwards, the method 300 proceeds to step S325, where communication with the first user is initiated using the first communication account obtained in step S315. Optionally, the initiator account and/or initiator identification of the second user obtained in step S320 may be presented to the first user. For example, a telephone call to the first user may be initiated using the telephone number of the first user, and the telephone number of the second user as the caller may be presented to the first user. Alternatively or additionally, the email address, instant messaging account, employee number of the second user or any other initiator identification specific to the second user may be presented to the first user, to be available for the first user to initiate a subsequent communication with the second user.

Return to step S310, if it is determined that the second user is not allowed to communicate with the first user using the first identification (step "No"), the method 300 may proceed to step S330 to invoke an error processing procedure. For example, in one embodiment, in step S330 error information may be directly returned to the second user to inform the second user that he/she is not authorized to initiate a communication with the first user using the first identification.

Figure 4:
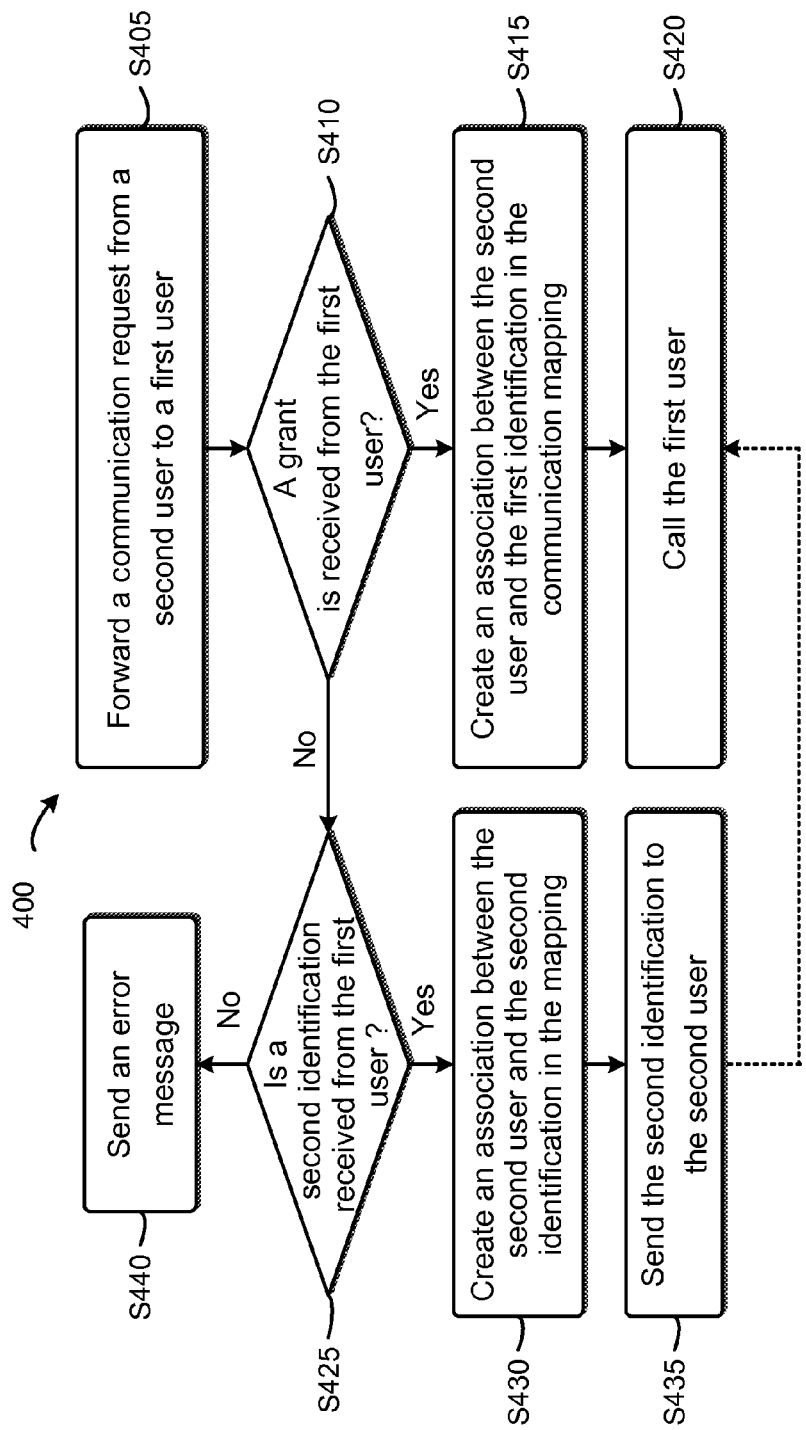
FIG. 4 shows a schematic flow diagram of a method for error processing according to the embodiments of the present invention.

In another embodiment, a more comprehensive error processing may be implemented. FIG. 4 shows a schematic flow diagram of a method 400 for error processing according to the embodiments of the present invention. It would be appreciated that the method 400 is a specific implementation of step S330.

The method 400 starts from step S405, where the communication request of the second user is forwarded to the first user. Forwarding the communication request to the first user may be implemented through any appropriate communication medium, including, but not limited to, a network communication message, an SMS message, an MMS message, etc. In one embodiment, besides the communication request, any other information related to the second user may be sent to the first user, e.g., the identity ID, telephone number, and/or any identification information of the second user. In this way, the first user may know that the second user desires to initiate a communication with him/her using the first identification.

Next, in step S410, it is determined whether a grant of the first user to a communication is received. If the grant is received (branch "Yes"), the method proceeds to step S415, where an association between the second user and the first identification is created in the communication mapping. In this way, the first user may respond to the request of the second user to dynamically set the second user as an authorized user to allow him/her to initiate a communication using the first identification.

Afterwards, the method 400 may proceed to step S420, where a call to the first user is initiated. In step S420, a first communication account used by the first user in the communication may be obtained, and the communication is initiated using the first communication account. Alternatively, the account used by the second user in the communication, i.e., the initiator account, may also be obtained to be presented to the first user when initiating the communication. These operations have been described above in steps S315 to S325 with reference to FIG. 3, which will not be detailed here.

On the other hand, if the grant of the first user to the communication request is not received in step S410 (branch "No"), the method 400 proceeds to step S425, where it is determined whether a second identification associated with the first user is received from the first user. The second identification is an identification different from the first identification. Of course, similar to the first identification, the second identification is not the communication account of the first user for the communication of the current kind. In other words, according to the embodiments of the present invention, the first user may be allowed to adjust the identification in the initial communication request. For example, the second user may originally request for using the email address of the first user to call the first user. However, the first user may indicate the server that he/she only authorizes the second user to use an employee number, rather than the email address, to initiate a telephone call. In this way, the first user may have a better control on the communication.

If it is determined in step S425 that the second identification specific to the first user has been received (branch "Yes"), the method 400 proceeds to step S430, where an association between the second user and the second identification is created in the communication mapping. Next, in step S435, the second identification may be provided to the second user to inform the second user that the first user does not grant use of the first identification to communicate, but allows use of the second identification to communicate.

In one embodiment, the method 400 may subsequently proceed to step S420, where a communication to the first user is initiated. Alternatively, the method 400 may end. In the latter case, the second user needs to re-initiate a communication request using the second identification provided in step S435, to initiate a communication with the first user.

On the other hand, if a second identification specific to the first user is not received in step S425 (branch "No"), the method 400 may proceed to step S440, where an error message is sent to the second user. In other words, in the case that the first user does not grant use of the first identification or provide any alternative second identification, the second user may be informed of being unable to initiate a communication with the first user.

Through performing method 300 and optional method 400, a user as a communication target may allow the communication initiator to use other identification to initiate a communication (e.g., telephone call) without displaying its own communication account (e.g., telephone number) to the communication initiator. Besides, when the communication account (e.g., telephone number) of the user changes, it is only needed to update the communication mapping 235 maintained at the server. A personal user does not need to specifically update his/her local contact list. In this way, it significantly reduces the interaction load associating with maintaining the contact list while ensuring a normal communication.

As described above, according to the embodiments of the present invention, the communication service provide may provide a specific user interface to a user, such that the user can create and maintain a communication mapping associated therewith. According to the embodiments of the present invention, the maintenance to the communication mapping, for example, may comprise creating, deleting and/or editing a mapping entry, to allow a specific user to initiate a communication using a specific identification. Besides by virtue of voluntary update of the user interface, as depicted above in method 400 with reference to FIG. 4, in response to a communication request from a communication initiating user (second user), the user may also be dynamically added to the communication mapping of the communication target (first user).

Alternatively or additionally, in one embodiment, a user is allowed to maintain the communication mapping associated therewith by virtue of signaling. Only for the purpose of illustration, suppose the first user wishes another user (called "third user") can communicate therewith through a certain identification (called "third identification") specific to the first user. In this case, the first user may send the identity information of the third user and the third identification to the server signal. For example, the first user may send the identity information of the third user to the server through any appropriate means such as a network communication message, an SMS message, an MMS message, etc.

The identity information of the third user may be any appropriate information, e.g., the global identity ID, the specific identification of the third user, as described above, and among others. In particular, if a protocol about communication has been reached between the first user and the third user, the third user may apply for a globally unique code from the server. The code, e.g., may be generated by the server and has a predefined finite life cycle. The server may send the code to the third user who forwards it to the first user. In this way, the first user may send the code to the server to indicate the identity of the third user.

In response to the signaling from the first user, the server may create an association between the third user and the third identification in the communication mapping associated with the first user. Therefore, the third user may subsequently use the third identification to initiate the communication with the first user.

In particular, in one embodiment, the third user may recommend the first user an identification for initiating a communication. The first user may select agreeing with the third user's recommendation. Alternatively, the first user may also change the identification. In other words, the third identification sent by the first user to the system might be different from the identification initially recommended by the third user to the first user. For example, the third user might recommend using an employee number to perform a telephone call, but the first user decides to use the email address. To this end, in one embodiment, the server may send the third identification finally determined by the first user to the third user for subsequent use.

Figure 5:
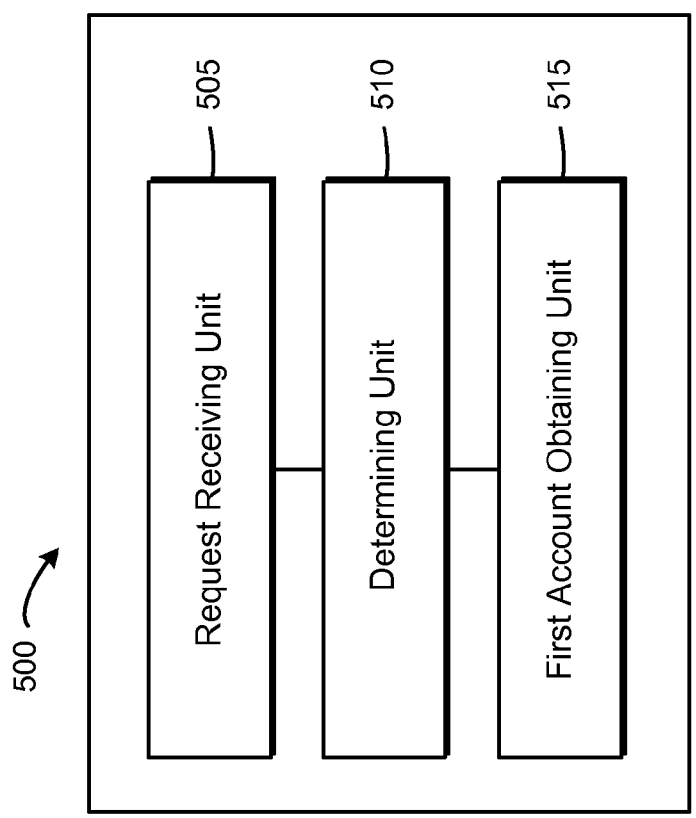
FIG. 5 shows a schematic block diagram of an apparatus for communication control according to the embodiments of the present invention.

FIG. 5 shows a schematic block diagram of an apparatus 500 for communication control according to the embodiments of the present invention. As shown in the figure, the apparatus 500 comprises: a request receiving unit 505 configured to receive, from a second user, a request for communicating with a first user, the request including a first identification specific to the first user, the first identification being different from an account used by the first user in the communication; a determining unit 510 configured to determine, based on a communication mapping associated with the first user, whether the second user is allowed to communicate with the first user using the first identification, the communication mapping indicating authorized users allowed to communicate with the first user and respective identifications allowed to be used by the authorized users; and a first account obtaining unit 515 configured to obtain, in response to determining that the second user is allowed to communicate with the first user using the first identification, the account used by the first user in the communication to initiate the communication with the first user.

In one embodiment, the determining unit 510 may comprise: a group searching unit configured to search for a user group in which both of the first user and the second user are members; and a group determining unit configured to in response to finding the user group, determine whether a group communication mapping for the user group includes the first identification, the group communication mapping indicating identifications allowed to initiate communications between members of the user group. The group determining unit may also be configured to, in response to determining that the group communication mapping includes the first identification, determine that the second user is allowed to communicate with the first user using the first identification.

In one embodiment, the first account obtaining unit 515 may comprise: an association account obtaining unit configured to obtain a communication account of the first user associated with the first identification based on the communication mapping, as the account used by the first user in the communication.

In one embodiment, the apparatus 500 may also comprise: a second account obtaining unit configured to obtain an initiator account used by the second user in the communication; and a second account presenting unit configured to present the initiator account to the first user in the communication with the first user.

In one embodiment, the apparatus 500 may also comprise: an initiator identification obtaining unit configured to obtain an initiator identification specific to the second user, the initiator identification being available for the first user to initiate a second communication with the second user, and the initiator identification being different from the account used by the second user in the second communication; and an initiator identification presenting unit configured to present the initiator identification to the first user in the communication with the first user.

In one embodiment, the apparatus 500 may also comprise: a request forwarding unit configured to forward the request to the first user in response to determining that the second user is not allowed to use the first identification to communicate with the first user.

In one embodiment, the apparatus 500 may further comprise: a first association creating unit configured to create an association between the second user and the first identification in response to receiving a grant of the first user to the request.

In one embodiment, the apparatus 500 may also comprise: a second association creating unit configured to, in response to receiving, from the first user, a second identification of the first user, create an association between the second user and the second identification in the communication mapping; and an identification sending unit configured to send the second identification to the second user.

In one embodiment, the apparatus 500 may further comprise: a communication mapping maintenance unit configured to maintain the communication mapping in response to a request from the first user. In one embodiment, the communication mapping maintenance unit may comprise: a signaling receiving unit configured to receive, from the first user, a third identification specific to the first user and a globally unique code, the code being generated in response to a request from a third user; a user identifying unit configured to identify the third user based on the code; and a third association creating unit configured to create, in the communication mapping, an association between the third user and the third identification.

In one embodiment, the communication is a telephone call, a short messaging service SMS communication or a multimedia messaging service MMS communication, wherein the first identification is an email address, an instant messaging account, an internal code of an organization, or a network nickname.

It should be noted that for the sake of clarity, FIG. 5 does not show optional units or sub-units included in the apparatus 500. All features and operations as described above are suitable for apparatus 500, respectively, which are therefore not detailed here. Moreover, partitioning of units or subunits in apparatus 500 is exemplary, rather than limitative, intended to describe its main functions or operations logically. A function of one unit may be implemented by a plurality of other units; on the contrary, a plurality of units may be implemented by one unit. The scope of the present invention is not limited in this aspect.

Moreover, the units included in the apparatus 500 may be implemented by various manners, including software, hardware, firmware or a random combination thereof. For example, in some embodiments, the apparatus may be implemented by software and/or firmware. Alternatively or additionally, the apparatus 500 may be implemented partially or completely based on hardware. for example, one or more units in the apparatus 500 may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. An apparatus for communication control, the apparatus comprising:
   a memory; and
   a processor, the processor communicatively coupled to the memory, the processor configured to:
   receive, from an initiator, a request to initiate a communication with a first user, the request including a first identification specific to the first user, the first identification being different from a first communication account used by the first user to receive communications;
   determine, based on a communication mapping associated with the first user, whether the initiator is allowed to communicate with the first user using the first identification, the communication mapping indicating authorized initiators allowed to communicate with the first user and respective identifications to be used by the authorized initiators, wherein the communication mapping is solely assigned to the first user, and wherein the communication mapping is separate from any communication mapping of the initiator, and wherein the communication mapping of the first user is solely used for the determination;
   obtain, in response to determining that the initiator is allowed to communicate with the first user using the first identification and from the communication mapping, the first communication account used by the first user, the first communication account distinct from a plurality of communication account entries of the first user used to receive communications from other initiators;
   obtain, from the communication mapping, an initiator identification specific to the initiator, the initiator identification being different from an initiator communication account to be used by the initiator for the communication, the initiator identification being generated by a communication service provider that facilitates the communication between the initiator and the first user; and
   present the initiator identification to the first user in the communication between the initiator and the first user.

2. The apparatus according to claim 1, wherein the processor is further configured to:
   search for a user group in which both of the first user and the initiator are members;
   in response to the user group being found, determine whether a group communication mapping for the user group includes the first identification, the group communication mapping indicating identifications allowed to initiate communications between members of the user group; and
   in response to determining that the group communication mapping includes the first identification, determine that the initiator is allowed to communicate with the first user using the first identification.

3. The apparatus according to claim 1, wherein the processor is further configured to:
   obtain the initiator communication account used by the initiator in the communication; and
   present, in the communication with the first user, the initiator communication account.

4. The apparatus according to claim 1, wherein
the initiator identification being available for the first user to initiate a second communication with the initiator.

5. The apparatus according to claim 1, wherein the processor is further configured to:
forward the request to the first user in response to determining that the initiator is not allowed to use the first identification to communicate with the first user.

6. The apparatus according to claim 5, wherein the processor is further configured to:
create an association between the initiator and the first identification in response to receiving a grant on the request by the first user.

7. The apparatus according to claim 5, wherein the processor is further configured to:
in response to receiving from the first user a second identification specific to the first user, create an association between the initiator and the second identification in the communication mapping; and
send the second identification to the initiator.

8. The apparatus according to claim 1, wherein the processor is further configured to:
maintain the communication mapping in response to a request from the first user.

9. The apparatus according to claim 8, wherein the processor is further configured to:
receive, from the first user, a third identification specific to the first user and a globally unique code, the code being generated in response to a request from a third user;
identify the third user based on the code; and
create, in the communication mapping, an association between the third user and the third identification.

10. The apparatus according to claim 1, wherein the initiator identification is generated based on a random string of letters, numbers, and symbols.

11. The Apparatus of claim 1, wherein any further transmission from a given initiator is prevented based on the absence of a communication mapping.

12. The apparatus of claim 11, wherein the initiator identification is a QR code.

13. An apparatus for communication control, the apparatus comprising:
a memory; and
a processor, the processor communicatively coupled to the memory, the processor configured to:
receive, from an initiator, a request to initiate a communication with a first user, the request including a first identification specific to the first user, the first identification being different from a first communication account used by the first user to receive communications;
determine, based on a communication mapping associated with the first user, whether the initiator is allowed to communicate with the first user using the first identification, the communication mapping indicating authorized initiators allowed to communicate with the first user and respective identifications to be used by the authorized initiators, wherein the communication mapping is solely assigned to the first user, and wherein the communication mapping is separate from any communication mapping of the initiator, and wherein the communication mapping of the first user is solely used for the determination;
obtain, in response to determining that the initiator is allowed to communicate with the first user using the first identification and from the communication mapping, the first communication account used by the first user, the first communication account distinct from a plurality of communication account entries of the first user used to receive communications from other initiators;
obtain, from the communication mapping, an initiator identification specific to the initiator, the initiator identification being different from an initiator communication account to be used by the initiator for the communication, the initiator identification being a code assigned by an enterprise; and
present the initiator identification to the first user in the communication between the initiator and the first user.

14. The Apparatus of claim 13, wherein any further transmission from a given initiator is prevented based on the absence of a communication mapping.

* * * * *